Figure 1:
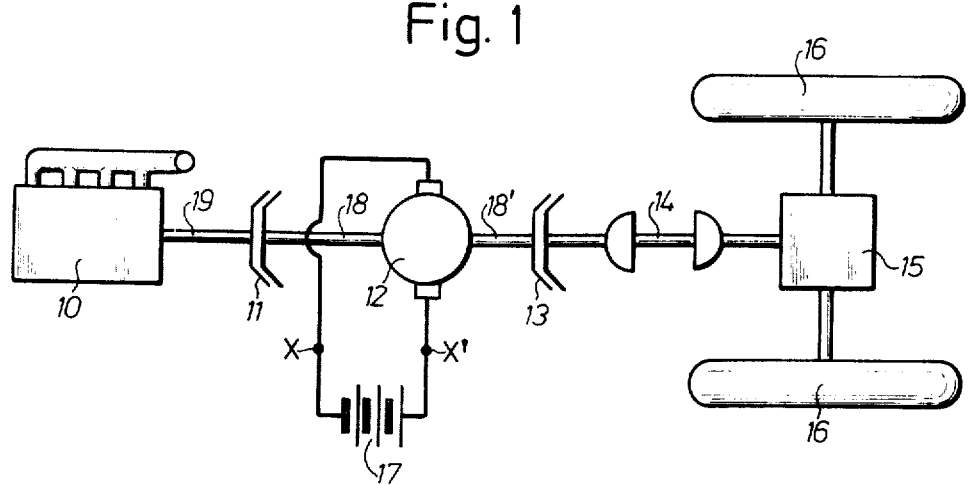

United States Patent [19]
Reinbeck

[11] 3,888,325
[45] June 10, 1975

[54] MOTOR-DRIVEN VEHICLE WITH HYBRID INTERNAL COMBUSTION AND ELECTRICAL DRIVE

[75] Inventor: Hans Reinbeck, Stuttgart, Germany

[73] Assignee: Robert Bosch G.m.b.H., Gerlingen-Schillerhohe, Germany

[22] Filed: Feb. 20, 1974

[21] Appl. No.: 444,121

Related U.S. Application Data

[63] Continuation of Ser. No. 256,102, May 23, 1972, abandoned.

[30] Foreign Application Priority Data

July 6, 1971 Germany............................ 2133485

[52] U.S. Cl................................. 180/65 A; 290/45
[51] Int. Cl................................................ B60k 1/00
[58] Field of Search......... 180/65 A, 65 R; 318/230; 290/20, 45

[56] References Cited
UNITED STATES PATENTS

| | | | |
|---|---|---|---|
| 1,402,250 | 1/1922 | Pieper | 180/65 A |
| 1,410,276 | 3/1922 | Stephenson | 180/65 A |
| 1,664,562 | 4/1928 | Jensen | 180/65 A |
| 1,824,014 | 9/1931 | Froelich | 180/65 A |
| 2,506,809 | 5/1950 | Nims | 180/65 A |
| 3,205,965 | 9/1965 | Roth | 180/65 A |
| 3,211,249 | 10/1965 | Papst | 180/65 A |
| 3,568,022 | 3/1971 | Domaun | 318/230 |

*Primary Examiner*—David Schonberg
*Assistant Examiner*—David M. Mitchell
*Attorney, Agent, or Firm*—Flynn & Frishauf

[57] ABSTRACT

A dynamo electric machine is connected, over a claw clutch, to the driving wheels of the vehicle; an internal combustion engine is connected over a slip clutch with the shaft of the electric motor, to permit selective drive of the vehicle either electrically, or by the internal combustion engine and, upon suitable interconnection of the dynamo electric machine, simulteneous re-charging of a storage battery when the vehicle is not driven by the dynamo electric machine acting as a motor.

7 Claims, 2 Drawing Figures

MOTOR-DRIVEN VEHICLE WITH HYBRID INTERNAL COMBUSTION AND ELECTRICAL DRIVE

This application is a continuation of U.S. Ser. No. 256,102, filed May 23, 1972, now abandoned. Cross reference to related patents: U.S. Pat. Nos. 3,568,022; 3,593,161; 3,731,169, May 1, 1973.

The present invention relates to a motor vehicle, and more particularly to the drive of a motor vehicle which includes an internal combustion engine and a dynamo electric machine, supplied from a secondary battery.

Motor vehicles are known in which the drive shaft to the wheels is driven by an electric motor. Such electric motors are driven from a battery which is to be charged from a generator. The generator may be driven by an internal combustion engine. Sine the internal combustion engine is loaded only by the generator, the internal combustion engine can be operated at a substantially constant speed with substantially constant loading thereon. This permits reducing the emission of noxious exhaust to a minimum. Motor vehicles which are so equipped may also operate over short stretches without any use of the internal combustion engine at all, the electric motor being driven from the battery alone, without re-charging the battery.

A drive of this type of motor vehicle is comparatively expensive since it requires two electric motors, namely a drive motor, and a generator to charge the battery.

It is an object of the present invention to provide a hybrid drive for motor vehicles in which the advantages of hybrid drive with respect to low noxious exhaust emission are retained without increasing the costs of the power plant for the vehicle.

Subject matter of the present invention: Briefly, a dynamo electric machine is operable both in generator mode as well as in motor mode, and has a double-ended drive shaft connected intermediate between the driven wheels of a vehicle and the internal combustion engine, to form an intermediate portion of the power drive train. The vehicle carries a storage battery, that is, a secondary battery, to store power from, and supply power to the dynamo electric machine. Means are provided to positively connect, or disconnect, without slip, the end of the dynamo electric machine directed towards the driven wheels to place the dynamo electric machine in fixed wheel driving connection in the drive train. Further connection means are provided to selectively, and independently from the positive connection means gradually connect the other end of the shaft of the dynamo electric machine to the internal combustion engine, to permit connection of the dynamo electric machine to the internal combustion engine independent of relative motion or speeds of the shaft of the internal combustion engine and the facing end of the shaft from the dynamo electric machine. The positive connection means typically are a claw clutch. The gradual and variable connection means typically are a slip clutch. This arrangement permits operation of the dynamo electric machine as a variable speed drive and avoids the necessity both of a starter motor for the internal combustion engine, as well as a gear transmission between the internal combustion engine and the driven wheels of the vehicle.

A hybrid drive as proposed utilizes a single dynamo electric machine selectively as a drive motor for the wheels as well as a generator to charge a battery. When the slip or first clutch is disengaged, the dynamo electric machine acts as a motor to drive the wheels. This mode of operation may be used, for example, when the vehicle is operating in a densely populated area. Upon engaging of the slip clutch, the internal combustion engine is connected to the rotor shaft of the dynamo electric machine and further to the drive wheels of the vehicle. If the internal combustion engine is sufficiently powerful, the electrical machine can now function as a generator to charge the battery, thus loading the internal combustion engine with a load which consumes the power necessary to drive the vehicle as well as the power to charge the battery. The second mode of operation can be selected when the motor vehicle is in rural environment, or in locations where a greater emission of noxious exhaust can be tolerated.

If necessary, and under emergency conditions, the internal combustion engine can charge the battery by driving the dynamo electric machine when, in accordance with a feature of the invention, the claw or second clutch between the drive shaft of the dynamo electric machine and the driven wheels is disengaged. This second or claw clutch is preferably so made that it can be operated only when the motor vehicle is stopped. The second clutch is then disconnected, and the first clutch connected, so that the internal combustion engine will drive only the dynamo electric machine. This particular form of the invention permits saving of an additional starter motor for the internal combustion engine as well. When the second clutch is disengaged, the dynamo electric machine can be used as a motor to start the internal combustion engine; and, after starting, the internal combustion engine can be utilized to operate the dynamo electric machine as a generator to permit later operation of the dynamo electric machine as a motor from the stored electric energy.

Figure 2:
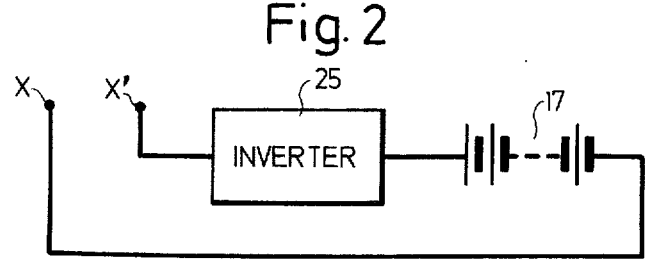

The invention will be described by way of example with reference to the accompanying drawings, wherein:

FIG. 1 is a highly schematic diagram of the motor vehicle drive, all portions of the motor vehicle not necessary to an understanding of the inventive concept having been omitted; and FIG. 2 is a schematic diagram of a modification of the arrangement in accordance with FIG. 1.

The motor vehicle has a pair of driven wheels 16, between which a differential 15 is arranged. Internal combustion engine 10 has an output shaft 19 connected over a first clutch 11 to shaft end 18 of a double-ended shaft of the rotor of dynamo electric machine 12. The dynamo electric machine 12 is connected to a battery 17. Rotor shaft end 18' is connected over a claw or second clutch 13 to a universal shaft 14 which connects to the differential 15.

The connection between dynamo electric machine 12 and battery 17 can be broken at points X-X' and connected, as seen in FIG. 2, over an inverter 25 to battery 17. Inverter 25, in turn, can be controlled by speed, control parameters of the internal combustion engine 10, and other parameters as described in the foregoing cross-referenced patents U.S. Pat. Nos. 3,568,022; 3,593,161; 3,731,169.

Three modes of operation immediately suggest themselves, depending on operation of the clutches and the prime movers.

First mode: Utilized primarily for urban or densely settled environments, where minimum emission of noxious exhaust is important: first clutch 11 disconnected, second clutch 13 connected. The two driven wheels 16 are driven solely from dynamo electric machine 12, operating as a motor, supplied by power from battery 17. Secondary battery 17 will discharge. The range of the vehicle depends on the size and capacity of the battery. Maximum speed in such operation is determined by the power output of the electric machine 12.

Second mode: Utilized primarily for cross-country runs, in sparsely settled environments, where noxious exhaust emissions are less of a problem: Both clutches 11 and 13 are engaged. The main drive of the vehicle is derived from internal combustion engine 10. Additional power to climb steep hills, or for rapid acceleration can be obtained by additionally connecting the dynamo electric machine 12 as a motor, and utilizing the additional power from the dynamo electric machine 12. When running downhill, or upon deceleration, and braking, the dynamo electric machine 12 can be operated as a generator, to re-charge battery 17. In a preferred form, the internal combustion engine should have somewhat greater power capability than that required to drive the motor vehicle alone (in the absence of dynamo electric machine 12) so that the machine 12 can absorb power from internal combustion engine 10 during all runs outside of urban environments to charge battery 17. Change-over from battery to generator operation is described in detail in the above referred-to cross-referenced patents.

The starting sequence proceeds as during operation in an urban environment, namely by using only the electric machine 12. When a suitable speed has been reached, for example 20 miles per hour or more, then first clutch 11 is engaged. This starts the internal combustion engine 10 which thereafter can take over all driving operations. The dynamo electric machine 12, in this instance, can also take over the role of a speed transmission, if engagement of the clutch 11 occurs at a speed when the internal combustion engine can take over direct drive operation of the vehicle.

Third mode: Utilized to charge the battery when the vehicle is stationary, if no outside line power supply should be available: In the previously described operating modes, clutch 13 has been in constant engagement. In the third mode of operation, clutch 13 is disengaged and first clutch 11 is engaged. In normal operation, particularly upon longer operation in an urban environment, the discharged battery should be re-charged by means of a battery charging apparatus connected to line power, so that the charging operation does not cause noxious exhaust emission and thus air pollution. In emergency situations, however, the internal combustion engine 10 is started by the dynamo electric machine 12, operating as a motor, so that an additional starting motor need not be used. The power to start the motor is usually still available from the battery, even if the battery has been sufficiently discharged so that the vehicle can no longer be operated therefrom. The electrical machine 12 then switches over to become a generator to charge battery 17.

The electrical machine 12 can be a direct current machine, or a three-phase asynchronous machine, as known from other vehicle drives (see the above cross-referenced patents). The direct current machine can be operated directly from battery 17. If a multi-phase asynchronous machine, such as a three-phase machine is utilized, a separate inverter circuit is required. The weight and size of three-phase asynchronous machines is less than that of a direct current machine of equal power output, so that the additional equipment for the inverter may not require more size, weight or cost than a similar direct current machine.

All known control systems for use with direct current machines can be used, for example controlled by resistors, control of the field, or pulse control by means of transistors or thyristors. Series or shunt wound or compound motors can be used.

The hybrid drive system for motor vehicles provides an effective prime mover and drive train. The previously utilized generator in customary hybrid drives is not necessary. Nevertheless, shorter stretches can be covered without any exhaust emission whatsoever. The exhaust emission for cross-country runs is smaller than with a vehicle which is driven solely by internal combustion engines, since the internal combustion engine can be uniformly loaded. The uniform loading is effected to some extent by the dynamo electric machine in the drive train which always accepts a portion of the power output of the internal combustion engine. If the loading in the IC engine from the driven wheels decreases, the portion of power accepted by the dynamo electric machine will increase. Such essentially constant load operation is efficient and causes the lowest exhaust emissions from internal combustion engines.

The hybrid drive is not limited to over-the-road vehicles, but can be utilized with tracked vehicles, railway equipment, power boats, sub-marines, or for any other mobile installation. When used with power boats, noise abatement ordinances can be fulfilled by operating the boats electrically near populated areas. In sub-marines, the electrical machine will be utilized for submerged operation, whereas the internal combustion engine will be utilized for surface operation.

Various changes and modifications may be made within the inventive concept.

I claim:

1. Motor driven conveyance comprising
    an internal combustion engine (10) having a power output rating in excess of that required to operate the conveyance and having an output shaft (19) forming one end of a power train for the conveyance;
    at least one driven wheel (16); at least one driven wheel axle and a drive shaft connected to said axle (14, 15) forming one end of the power drive train;
    a dynamo electric machine (12) of sufficient power to operate the conveyance, operable in generator mode or in motor mode, and having a double-ended shaft (18, 18'), one end (18') being directed towards said drive shaft and the other end (18) being directed towards the internal combustion engine shaft (19), said dynamo electric machine forming an intermediate portion of the power drive train;
    secondary battery means (17) carried on the conveyance to store power from, and supply power to the dynamo electric machine;
    means (13) to selectively and positively either connect, or disconnect, without slip, one end (18) of the dynamo electric machine shaft to the drive shaft and hence directly to the wheel only when the motor conveyance is stopped to place the dynamo electric machine in fixed direct wheel driving connection in the drive train;

means (11) to gradually connect the other end (18) of the shaft of said dynamo electric machine to said internal combustion engine (10), independently of relative motion, or speeds of the shaft (19) of the internal combustion engine (10) and said other end (18) of the shaft of the dynamo electric machine (12);

said gradual connection means (11) being independent of said positive connection means (13) to permit connection of said positive connection means and hence positive drive connection from the dynamo electric machine (12) directly to the wheel upon energization of the dynamo electric machine (12) and moving of the conveyance with the internal combustion engine (10) stopped, and then gradual connection of the internal combustion engine and hence starting of the internal combustion engine during such motion of the vehicle and during operation of the dynamo electric machine.

2. Conveyance according to claim 1, wherein the selective positive connection means (13) is a claw clutch.

3. Conveyance according to claim 1, wherein the gradual connection means (11) is a slip clutch.

4. Conveyance according to claim 1, wherein the dynamo electric machine (12) is a direct current machine.

5. Conveyance according to claim 1, wherein the dynamo electric machine (12) is a multi-phase alternating current asynchronous machine;

and an inverter (25) is provided interconnecting the battery (17) and the asynchronous machine.

6. Conveyance according to claim 1, wherein the double-ended shaft of the dynamo electric machine, the shaft of the internal combustion engine, said selective positive connection means and said gradual connection means, and said drive shaft for the driven wheels are co-planar to provide an in-line drive train, and to locate the rotor of the dynamo electric machine in in-line position within the drive train.

7. Conveyance according to claim 1, wherein the selective positive connection means comprises a claw clutch (13) disconnectable only if the conveyance is stopped and when the dynamo electric machine (12) is stopped.

* * * * *